US010418725B2

(12) United States Patent
Yang et al.

(10) Patent No.: US 10,418,725 B2
(45) Date of Patent: Sep. 17, 2019

(54) DUAL-POLARIZED ANTENNA AND ANTENNA ARRAY (71) Applicant: Huawei Technologies Co., Ltd., Shenzhen (CN)

(72) Inventors: ShiWen Yang, Chengdu (CN); Yanshan Gou, Chengdu (CN); Qiang Wang, Chengdu (CN); Weimin Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 255 days.

(21) Appl. No.: 15/247,636

(22) Filed: Aug. 25, 2016

(65) Prior Publication Data

US 2017/0012364 A1    Jan. 12, 2017

Related U.S. Application Data (63) Continuation of application No. PCT/CN2015/073112, filed on Feb. 15, 2015.

(30) Foreign Application Priority Data

Feb. 25, 2014  (CN) .......................... 2014 1 0064893

(51) Int. Cl.
*H01Q 21/24* (2006.01)
*H01Q 1/52* (2006.01)
(Continued)

(52) U.S. Cl.
CPC ............. *H01Q 21/24* (2013.01); *H01Q 1/246* (2013.01); *H01Q 1/48* (2013.01); *H01Q 1/52* (2013.01);
(Continued)

(58) Field of Classification Search
CPC ......... H01Q 1/48; H01Q 9/0435; H01Q 21/24
See application file for complete search history.

(56) References Cited

U.S. PATENT DOCUMENTS 7,385,563 B2   6/2008  Bishop
8,253,647 B2   8/2012  Le et al.
(Continued)

FOREIGN PATENT DOCUMENTS

CN    2505992 Y    8/2002
CN    1421958 A    6/2003
(Continued)

OTHER PUBLICATIONS

Changsheng, "Talk about antenna isolation," Electronic Science and Technology Bulletin, Tsinghua University, Beijing, China (Nov. 30, 1997).
(Continued)

*Primary Examiner* — Jessica Han
*Assistant Examiner* — Amal Patel
(74) *Attorney, Agent, or Firm* — Leydig, Voit & Mayer, Ltd.

(57) ABSTRACT

The present invention discloses a dual-polarized antenna that includes a ground plate, a feeding part, and a radiant plate. The feeding part includes a first feeding part and a second feeding part. The first feeding part includes a first dielectric plate, a first feeding layer, and a first transmission line. The second feeding part includes a second dielectric plate, a second feeding layer, and a second transmission line. The first dielectric plate and the second dielectric plate are placed perpendicularly to each other and are perpendicularly installed on the ground plate, and the first transmission line and the second transmission line are separated from each other.

12 Claims, 8 Drawing Sheets

(51) Int. Cl.
  *H01Q 9/04* (2006.01)
  *H01Q 1/48* (2006.01)
  *H01Q 9/42* (2006.01)
  *H04L 5/14* (2006.01)
  *H01Q 1/24* (2006.01)

(52) U.S. Cl.
  CPC ........... *H01Q 1/523* (2013.01); *H01Q 9/0435* (2013.01); *H01Q 9/0457* (2013.01); *H01Q 9/42* (2013.01); *H04L 5/14* (2013.01)

(56) References Cited

U.S. PATENT DOCUMENTS

| | | | |
|---|---|---|---|
| 2004/0056818 A1* | 3/2004 | Sledkov | H01Q 1/246 343/797 |
| 2008/0062058 A1 | 3/2008 | Bishop | |
| 2009/0073075 A1 | 3/2009 | Irion, II et al. | |
| 2009/0274072 A1 | 11/2009 | Knox | |
| 2010/0220034 A1 | 9/2010 | Le et al. | |
| 2010/0302104 A1 | 12/2010 | Luk et al. | |
| 2013/0271336 A1 | 10/2013 | Plet et al. | |
| 2014/0049439 A1 | 2/2014 | Ho | |
| 2015/0255882 A1* | 9/2015 | Segador | H01Q 21/26 343/797 |

FOREIGN PATENT DOCUMENTS

| | | |
|---|---|---|
| CN | 1688067 A | 10/2005 |
| CN | 201289904 Y | 8/2009 |
| CN | 101673881 A | 3/2010 |
| CN | 101820095 A | 9/2010 |
| CN | 202373694 U | 8/2012 |
| CN | 202496171 U | 10/2012 |
| CN | 101159352 B | 5/2013 |
| CN | 103367897 A | 10/2013 |
| JP | 2011244244 A | 12/2011 |
| JP | 2013026707 A | 2/2013 |
| KR | 20040027389 A | 4/2004 |
| KR | 20110010097 A | 1/2011 |
| KR | 20140018620 A | 2/2014 |
| WO | 2009132358 A1 | 10/2009 |
| WO | WO 2013104110 A1 | 7/2013 |

OTHER PUBLICATIONS

Secman et al., "A Dual-Polarized Wide-Band Patch Antenna for Indoor Mobile Communication Applications," Progress in Electromagnetics Research, vol. 100, pp. 189-200, (2010).

Barba, "A High-Isolation, Wideband, and Dual-Linear Polarization Patch Antenna," IEEE Transactions on Antennas and Propagation, vol. 56, No. 5, pp. 1472-1476, Institute of Electrical and Electronics Engineers, New York, New York (May 2008).

Xie et al., "A Wideband Dual-Polarized Patch Antenna with Electric Probe and Magnetic Loop Feeds," Progress in Electromagnetics Research, vol. 132, pp. 499-515 (2012).

Choi et al., "Achieving Single Channel, Full Duplex Wireless Communication," MobiCom '10 Proceedings of the sixteenth annual international conference on Mobile computing and networking, pp. 1-12, ACM, Chicago, Illinois (2010).

Li et al., "Wideband Dual-Polarized Patch Antenna With Low Cross Polarization and High Isolation," IEEE Antennas and Wireless Propagation Letters, vol. 11, pp. 427-430, Institute of Electrical and Electronics Engineers, New York, New York (2012).

Tzung-Wern et al., "Broad-Band Dual-Polarized Single Microstrip Patch Antenna with High Isolation and Low Cross Polarization," IEEE Transactions of Antennas and Propagation, vol. 50, No. 3, pp. 399-401, Institute of Electrical and Electronics, New York, New York (Mar. 2002).

Wong et al., "Design of Dual-Polarized L-Probe Patch Antenna Arrays with High Isolation," IEEE Transactions on Antennas and Propagation, vol. 52, No. 1, pp. 45-52, Institute of Electrical and Electronics, New York, New York (Jan. 2004).

Li et al., "Dual-polarised patch antenna with low cross-polarisation and high isolation for WiMAX applications," Electronics Letters, vol. 47, No. 17, pp. 952-953, Institute of Electrical and Electronics, New York, New York (Aug. 18, 2011).

Tang et al., "Dual-polarised dielectric resonator antenna with high isolation and low cross-polarisation," Electronics Letters, vol. 45, No. 14, Institute of Electrical and Electronics, New York, New York, (Jul. 2, 2009).

Duarte et al., "Experiment-Driven Characterization of Full-Duplex Wireless Systems," IEEE Transactions on Wireless Communications, vol. 11, No. 12, pp. 4296-4307, Institute of Electrical and Electronics, New York, New York (Dec. 2012).

Inclan-Sanchez et al., "High Isolation Proximity Coupled Multilayer Patch Antenna for Dual-Frequency Operation," IEEE Transactions on Antennas and Propagation, vol. 56, No. 4, pp. 1180-1183, Institute of Electrical and Electronics, New York, New York (Apr. 2008).

Kaboli et al., "High-Isolation XX-Polar Antenna," IEEE Transactions on Antennas and Propagation, vol. 60, No. 9, pp. 4046-4055, Institute of Electrical and Electronics, New York, New York (Sep. 2012).

Hong et al., "Picasso: Flexible RF and Spectrum Slicing," (2012).

Hong et al., "Picasso: Full Duplex Signal Shaping to Exploit Fragmented Spectrum," (2011).

Khojastepour et al., "The Case for Antenna Cancellation for Scalable Full-Duplex Wireless Communications," pp. 1-6 (2011).

Qiu et al., "Transmit-Receive Isolation Improvement of Antenna Arrays by Using EBG Structures," IEEE Antennas and Wireless Propagation Letters, vol. 11, pp. 93-96, Institute of Electrical and Electronics Engineers, New York, New York (2012).

Xie et al., "Wideband dual-polarised electromagnetic-fed patch antenna with high isolation and low cross-polarisation," Electronics Letters, vol. 49, No. 3, Institute of Electrical and Electronics Engineers, New York, New York (Jan. 31, 2013).

Wong et al., Design of Dual-Polarized L-Probe Patch Antenna Arrays With High Isolation, IEEE Transactions on Antennas and Propagation, XP-001046269, vol. 52, No. 1, pp. 45-52, Institute of Electrical and Electronics Engineers, New York, New York (Jan. 2004).

Ryu et al., "Wideband Dual-Polarized Microstrip Patch Excited by Hook Shaped Probes," IEEE Transactions on Antennas and Propagation, XP 11240569, vol. 56, No. 12, pp. 3645-3649, Institute of Electrical and Electronics Engineers, New York, New York (Dec. 2008).

* cited by examiner

DUAL-POLARIZED ANTENNA AND ANTENNA ARRAY

CROSS-REFERENCE TO RELATED APPLICATIONS

This application is a continuation of International Application No. PCT/CN2015/073112, filed on Feb. 15, 2015, which claims priority to Chinese Patent Application No. 201410064893.6, filed on Feb. 25, 2014, both of which are hereby incorporated by reference in their entireties.

TECHNICAL FIELD

Embodiments of the invention relate to an antenna, and in particular, to a dual-polarized antenna and an antenna array.

BACKGROUND

A radio communications system includes an uplink (UL) and a downlink (DL). A base station (BS) may send a signal to user equipment (UE) through the downlink, and the user equipment may send a signal to the base station through the uplink. When duplex communication is supported, to avoid mutual interference caused by parallel transmission of signals on the uplink and the downlink, it is necessary to separate an uplink signal from a downlink signal.

At present, a duplex mode used in the radio communications system includes frequency division duplex (FDD) and time division duplex (TDD). In the frequency division duplex mode, different carrier frequencies are used in the uplink and the downlink, and the uplink signal is separated from the downlink signal by using a frequency guard interval, which may implement simultaneous and inter-frequency full duplex communication. In the time division duplex mode, different communication time are used in the uplink and the downlink, and a receive signal is separated from a transmit signal by using a time guard interval, which may implement co-frequency and asynchronous half duplex communication. Compared with time sensed by a user, the time guard interval used in the time duplex mode is extremely short, and the time duplex mode is sometimes considered supporting the full duplex communication.

Figure 1:
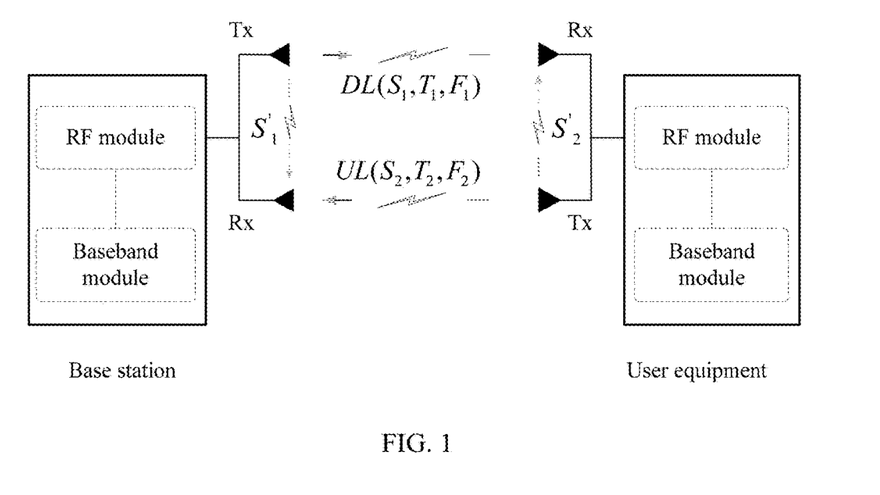
FIG. 1 is a schematic diagram of a scenario of a radio communications system in the prior art.

For example, FIG. 1 is a schematic diagram of a scenario of a radio communications system in the prior art. In the downlink, the base station sends a radio signal $S_1$ at a frequency $F_1$ to the user equipment at a time $T_1$; in the uplink, the user equipment sends a radio signal $S_2$ at a frequency $F_2$ to the base station at a time $T_2$. When the frequency division duplex is used, the frequency $F_1$ and the frequency $F_2$ are different, and there is a frequency guard interval between the uplink and the downlink, which may implement the simultaneous and inter-frequency full duplex communication. When the time division duplex is used, the time $T_1$ and the time $T_2$ are different, and there is a time guard interval between the uplink and the downlink, which may implement the co-frequency and asynchronous half duplex communication.

If the frequency $F_1$ and the frequency $F_2$ are the same, and the time $T_1$ and the time $T_2$ are also the same, when receiving the radio signal $S_2$ sent by the user equipment, the base station also receives a self-interference signal $S'_1$ at the same frequency, where the self-interference signal $S'_1$ may be considered a part of the radio signal $S_1$ sent by the base station. Likewise, when receiving the radio signal $S_1$ sent by the base station, the user equipment also receives a self-interference signal $S'_2$ at the same frequency. Due to fast fading of a radio signal during spatial propagation, strength of a local self-interference signal is generally much greater than strength of a radio signal from a remote end, and when sending signals, the base station and the user equipment cannot accurately receive signals at the same time. Therefore, it is generally considered that the radio communications system cannot support co-frequency and simultaneous full duplex communication until a full duplex technology occurs.

Theoretically, in a radio communications system that uses the full duplex technology, a same time and a same frequency are used in the uplink and the downlink, and spectral efficiency may be doubled. However, the full duplex technology is currently at a research and experimental stage, and how to effectively reduce impact of a local self-interference signal on receiving a radio signal from a remote end is still a critical technical problem that needs to be resolved in the full duplex technology. A current research direction mainly includes two types: one is eliminating a local self-interference signal by signal processing in an RF module; the other is optimization in an antenna to reduce strength of a local self-interference signal that enters an RF module.

In the prior art, design of the signal processing method in the RF module to eliminate the local self-interference signal is mainly considered, and design and optimization for the antenna are not common. In a current full duplex experimental communications system, an antenna system usually separates a transmit signal from a receive signal in a manner of physical isolation between antennas. For example, a physical distance between a receive antenna (Rx antenna) and a transmit antenna (Tx antenna) may be increased so as to improve isolation between the receive antenna and the transmit antenna. However, in this case, a size of the antenna system is relatively large, which hinders device miniaturization and deployment of an actual project. Therefore, an optimization design for an antenna that provides an antenna with good transceiving isolation is of great significance to an application of the full duplex technology in a future radio communications system.

SUMMARY

The present invention provides a dual-polarized antenna and an antenna array that have relatively high isolation between antenna ports.

Implementation manners of the present invention may be specifically implemented by using the following technical solutions.

According to a first aspect, a dual-polarized antenna (100) is provided and includes a ground plate (10), a feeding part (20), and a radiant plate (50), where:

the feeding part (20) is configured to feed an electromagnetic wave signal into the radiant plate (50) and includes a first feeding part (30) and a second feeding part (40), the ground plate (10) is disposed at the bottom of the feeding part (20), and the radiant plate (50) is disposed on the top of the feeding part (20);

the first feeding part (30) includes a first dielectric plate (32), a first feeding layer (34), and a first transmission line (36), where the first feeding layer (34) is disposed on one surface of the first dielectric plate (32), the first transmission line (36) is disposed on the other surface of the first dielectric plate (32) and a first port (360) is disposed in the first transmission line (36), and the first port (360) is configured to feed a signal into the first feeding part (30);

the second feeding part (40) includes a second dielectric plate (42), a second feeding layer (44), and a second transmission line (46), where the second feeding layer (44) is disposed on one surface of the second dielectric plate (42), the second transmission line (46) is disposed on the other surface of the second dielectric plate (42) and a second port (460) is disposed in the second transmission line (46), and the second port (460) is configured to feed a signal into the second feeding part (40); and the first dielectric plate (32) and the second dielectric plate (42) are perpendicularly installed on the ground plate (10), the first dielectric plate (32) and the second dielectric plate (42) are placed perpendicularly to each other, and the first transmission line (36) and the second transmission line (46) are separated from each other.

With reference to the first aspect, in a first possible implementation manner of the first aspect, a first opening (320) is disposed in the first dielectric plate (32), the first opening (320) extends from the bottom to the top of the first dielectric plate (32), a second opening (420) is disposed in the second dielectric plate (42), the second opening (420) extends from the top to the bottom of the second dielectric plate (42), and the first dielectric plate (32) and the second dielectric plate (42) are joined at the first opening (320) and the second opening (420) so as to be placed perpendicularly to each other.

With reference to the first possible implementation manner of the first aspect, in a second possible implementation manner of the first aspect, a first groove (342) is disposed at the first feeding layer (34), the first groove (342) extends from the top to the midst of the first feeding layer (34) and includes a first slot (340) and a second slot (341) connected with the first slot (340), and the first opening (320) penetrates through the second slot (341) and extends to the first slot (340); and a second groove (442) is disposed at the second feeding layer (44), the second groove (442) extends from the top to the midst of the second feeding layer (44) and includes a third slot (440) and a fourth slot (441) connected with the third slot (440), and the second opening (420) penetrates into the third slot (440).

With reference to the first or the second possible implementation manner of the first aspect, in a third possible implementation manner of the first aspect, the radiant plate (50) includes a radiating layer (54), the radiating layer (54) is disposed on a lower surface of the radiant plate (50), and the feeding part (20) feeds a signal in the radiating layer (54) in a coupling manner.

With reference to the third possible implementation manner of the first aspect, in a fourth possible implementation manner of the first aspect, a shape of the radiating layer (54) is a 4N-regular-polygon, a hollow 4N-regular-polygon, a circle, or an annulus, where N is an integer greater than or equal to 1.

With reference to any one of the first to the fourth possible implementation manners of the first aspect, in a fifth possible implementation manner of the first aspect, the first port (360) is disposed at an end of the first transmission line (36), and extends from the bottom to the top of the first dielectric plate (32); and the first transmission line (36) further includes a first part of transmission line (362), a second part of transmission line (364), and a third part of transmission line (366), the first part of transmission line (362) extends from an end of the first port (360) to the top of the first dielectric plate (32) and is parallel with the first opening (320), the second part of transmission line (364) spans over the first opening (320) and is perpendicularly connected to the first part of transmission line (362), and the third part of transmission line (366) perpendicularly extends from an end of the second part of transmission line (364) to the bottom of the first dielectric plate (32).

With reference to any one of the first to the fifth possible implementation manners of the first aspect, in a sixth possible implementation manner of the first aspect, the second port (460) is disposed at an end of the second transmission line (46), and extends from the bottom to the top of the second dielectric plate (42); and the second transmission line (46) includes a fourth part of transmission line (462), a fifth part of transmission line (464), and a sixth part of transmission line (466), the fourth part of transmission line (462) extends from an end of the second port (460) to the top of the second dielectric plate (42) and is parallel with the second opening (420), the fifth part of transmission line (464) is perpendicularly connected to the fourth part of transmission line (462), and the sixth part of transmission line (466) perpendicularly extends from an end of the fifth part of transmission line (464) to the bottom of the second dielectric plate (42).

With reference to the sixth possible implementation manner of the first aspect, in a seventh possible implementation manner of the first aspect, the midst of the fifth part of transmission line (464) is bent towards the bottom of the second dielectric plate (42) to form a bending part so as to prevent the second opening (420) from penetrating through the fifth part of transmission line (464).

With reference to any one of the first to the seventh possible implementation manners of the first aspect, in an eighth possible implementation manner of the first aspect, the dual-polarized antenna (100) further includes a pair of connectors (60), one of the connectors (60) is electrically connected to the first port (360), the other one of the connectors (60) is electrically connected to the second port (460), and the pair of connectors (60) is configured to feed signals into the first feeding part (30) and the second feeding part (40).

According to a second aspect, an antenna array (200) is further provided and includes a pair of the antennas in any one of the first aspect or the first to the ninth possible implementation manners of the first aspect and a pair of housings (220), where each of the housings (220) is secured to the ground plate (212) and includes multiple separation walls (222), and the separation walls (222) form a fence configured to fence the antennas (210).

With reference to the second aspect, in a first possible implementation manner of the second aspect, the antenna array (200) further includes a grounding strip array (320) that is located between the two of the housings (220) and that is configured to improve isolation between different antennas (210).

With reference to the first possible implementation manner of the second aspect, in a second possible implementation manner of the second aspect, the grounding strip array (320) includes two groups of axisymmetric grounding strips, an axis of the axial symmetry is located at a perpendicular bisector of the pair of the dual-polarized antennas (210), heights and lengths of each group of grounding strips progressively decrease from an outside to an inside, the outside is close to the dual-polarized antennas (210), and the inside is close to the axis of the axial symmetry.

With reference to the second possible implementation manner of the second aspect, in a third possible implementation manner of the second aspect, the grounding strip array (320) is a metallic strip array, a ferrite strip array, a left-handed material strip array, or an electromagnetic band gap structure.

With reference to the first or the second possible implementation manner of the second aspect, in the third possible implementation manner of the second aspect, each of the housings (220) includes multiple card slots (312), multiple card blocks (332) are disposed on the ground plate (10), and the card blocks (332) are inserted into the card slots (312), so as to secure the housings (220) to the ground plate (10).

With reference to the first, the second, or the third possible implementation manner of the second aspect, in a fourth possible implementation manner of the second aspect, the antenna array (200) further includes a radome (230), and the radome (230) covers the antenna array (200).

According to a third aspect, an antenna array is further provided and includes a pair of antennas and a grounding strip array (320), each of the antennas includes a ground plate (330), the grounding strip array (320) is secured to the ground plate (330) and is located between the two of the antennas (210) so as to improve isolation between the antennas.

With reference to the third aspect, the antenna array (200) further includes a pair of housings (220), each of the housings (220) is secured to the ground plate (330) and includes multiple separation walls (222), the separation walls (222) form a fence configured to fence each of the antennas, and the grounding strip array (320) is located between the two of the housings (220).

With reference to the first possible implementation manner of the third aspect, in a second possible implementation manner of the third aspect, the grounding strip array (320) includes two groups of axisymmetric grounding strips, an axis of the axial symmetry is located at a perpendicular bisector of the pair of the dual-polarized antennas, heights and lengths of each group of grounding strips progressively decrease from an outside to an inside, the outside is close to the dual-polarized antennas, and the inside is close to the axis of the axial symmetry.

With reference to the second possible implementation manner of the third aspect, in a third possible implementation manner of the third aspect, the grounding strip array (320) is a metallic strip array, a ferrite strip array, a left-handed material strip array, or an electromagnetic band gap structure.

With reference to the first or the second possible implementation manner of the third aspect, in the third possible implementation manner of the second aspect, each of the housings (220) includes multiple card slots (312), multiple card blocks (332) are disposed on the ground plate (10), and the card blocks (332) are inserted into the card slots (312), so as to secure the housings (220) to the ground plate (10).

With reference to the first, the second, or the third possible implementation manner of the third aspect, in a fourth possible implementation manner of the second aspect, the antenna array (200) further includes a radome (230), and the radome (230) covers the antenna array (200), where each of the housings (220) includes multiple card slots (312), multiple card blocks (332) are disposed on the ground plate (10), and the card blocks (332) are inserted into the card slots (312), so as to secure the housings (220) to the ground plate (330).

According to the dual-polarized antenna or the antenna array provided in embodiments of the present invention, using feeding networks that are perpendicularly placed, after signals are fed at a first port and a second port, electromagnetic waves parallel with the first dielectric plate and the second dielectric plate may be separately generated, and polarization directions of electromagnetic waves coupled to a radiant plate are perpendicular to each other, which ensures high isolation between antenna ports.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention in detail with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Referring to FIG. 2 to FIG. 6 at the same time, FIG. 2 to FIG. 6 show a dual-polarized antenna 100 according to a first implementation manner of the present invention. The dual-polarized antenna 100 includes a ground plate 10, a feeding part 20, and a radiant plate 50. The ground plate 10 is disposed at the bottom of the feeding part 20, and the radiant plate 50 is disposed on the top of the feeding part 20. The feeding part 20 is configured to feed an electromagnetic wave signal into the radiant plate 50, and includes a first feeding part 30 and a second feeding part 40. The first feeding part 30 includes a first dielectric plate 32, a first feeding layer 34, and a first transmission line 36, where the first feeding layer 34 is disposed on one surface of the first dielectric plate 32, and the first transmission line 36 is disposed on the other surface of the first dielectric plate 32 and a first port 360 is disposed in the first transmission line 36. The second feeding part 40 includes a second dielectric plate 42, a second feeding layer 44, and a second transmission line 46, where the second feeding layer 44 is disposed on one surface of the second dielectric plate 42, and the second transmission line 46 is disposed on the other surface of the second dielectric plate 42 and a second port 460 is disposed in the second transmission line 46. The first dielectric plate 32 and the second dielectric plate 42 are perpendicularly installed on the ground plate 10, the first dielectric plate 32 and the second dielectric plate 42 are perpendicularly placed, and the first transmission line 36 and the second transmission line 46 are separated from each other.

Figure 2:
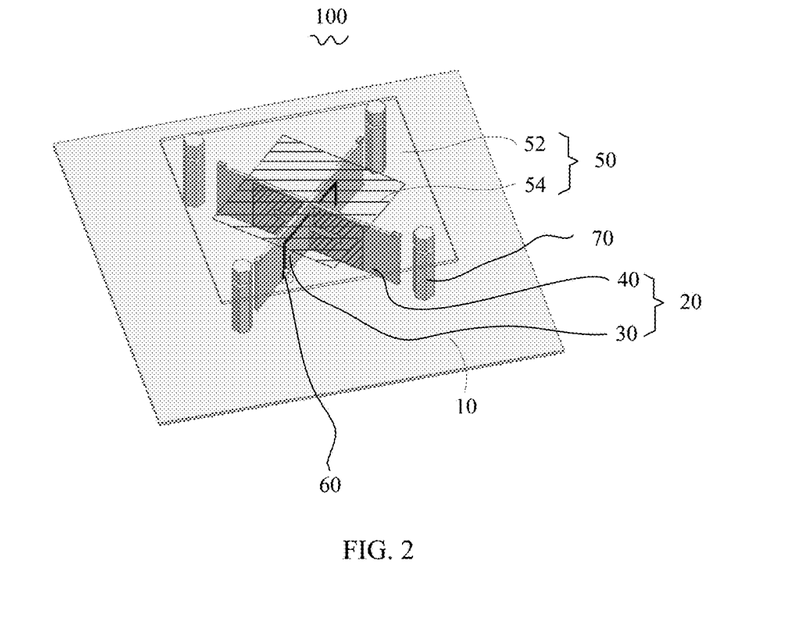
FIG. 2 is a perspective schematic diagram of assembly of a dual-polarized antenna according to a first implementation manner of the present invention.

A specific implementation manner of perpendicularly placing the first dielectric plate 32 and the second dielectric plate 42 is not limited. Optionally, the first dielectric plate 32 and the second dielectric plate 42 are perpendicularly and orthogonally installed on the ground plate 10, and the perpendicularity and orthogonality includes that the first dielectric plate 32 and the second dielectric plate 42 are perpendicular and intersecting right in the middle position of one of the dielectric plates, or are perpendicular and intersecting right in the middle position of the two dielectric plates, so as to achieve better structural symmetry.

Optionally, structures of the first dielectric plate 32 and the second dielectric plate 42 may be the same. For example, lengths, widths, and thicknesses of the first dielectric plate 32 and the second dielectric plate 42 are partially the same or all the same. The first feeding layer 34 and the second feeding layer 44 may be of a metal-surface-mount structure. The first transmission line 36 and the second transmission line 46 may be microstrip transmission lines. The first feeding layer 34 and the first transmission line 36 are included in a first feeding network, the second feeding layer 44 and the second transmission line 46 are included in a second feeding network, and the first feeding network and the second feeding network are used to feed electromagnetic wave signals into the radiant plate 50.

Optionally, the first dielectric plate 32 and the second dielectric plate 42 may be printed circuit boards, the first feeding layer 34 and the first transmission line 36 may be printed on the first dielectric plate 32, and the second feeding layer 44 and the second transmission line 46 are printed on the second dielectric plate 42.

The dual-polarized antenna provided in this embodiment of the present invention uses perpendicularly placed feeding networks. After signals are fed at a first port and a second port, electromagnetic waves parallel with the first dielectric plate and the second dielectric plate may be separately generated, and polarization directions of electromagnetic waves coupled to a radiant plate are perpendicular to each other, which ensures high isolation between antenna ports. In addition, in a case that a first feeding network and a second feeding network are perpendicularly and orthogonally placed, because of structural symmetry of the feeding networks, when feeding is performed at one of the ports, energy coupled to the other port by the feeding network corresponding to the one of the ports is greatly weakened, which may further improve isolation between antenna ports.

Figure 3:
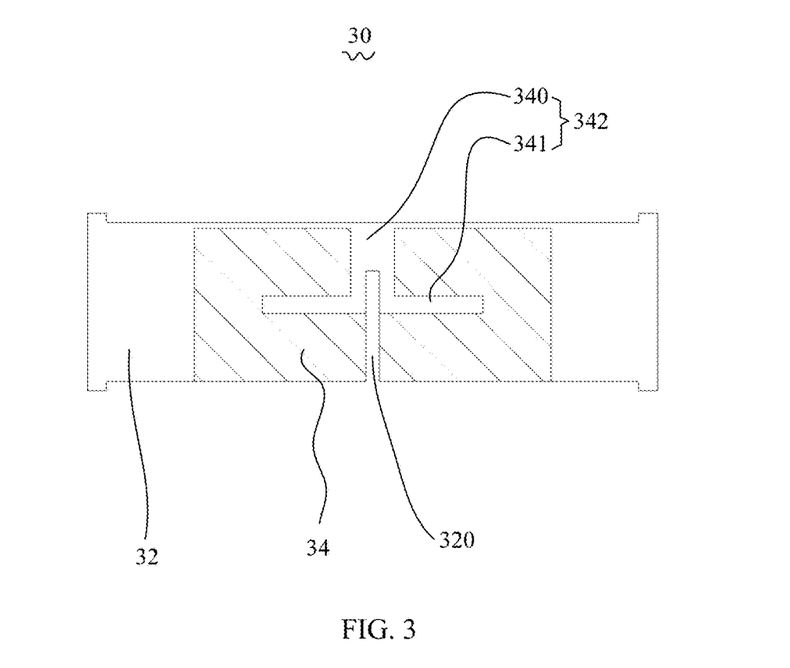
FIG. 3 is a front schematic diagram of a first feeding part shown in FIG. 2.
Figure 4:
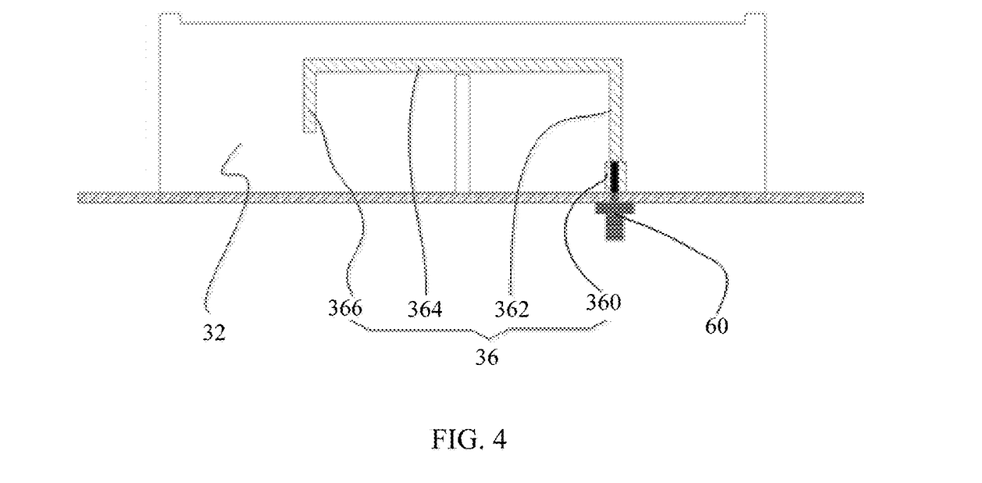
FIG. 4 is a rear schematic diagram of a first feeding part shown in FIG. 2.
Figure 5:
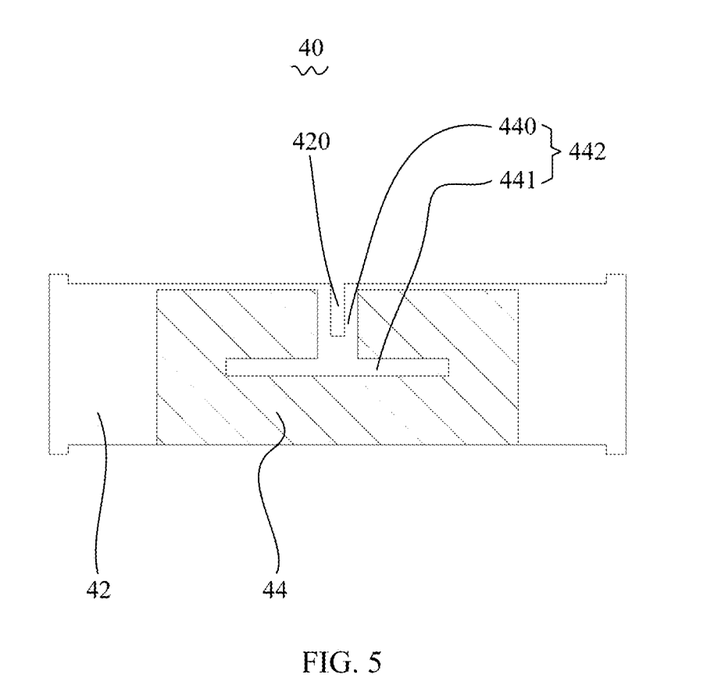
FIG. 5 is a front schematic diagram of a second feeding part shown in FIG. 2.
Figure 6:
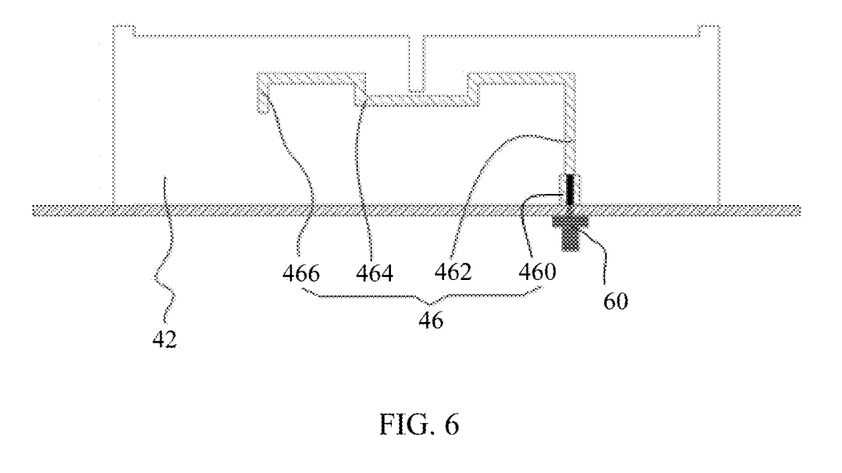
FIG. 6 is a rear schematic diagram of a second feeding part shown in FIG. 2.

As shown in FIG. 3 and FIG. 4, as a further improvement of the present invention, to facilitate installation, a first opening 320 is disposed in the first dielectric plate 32, and the first opening 320 extends from the bottom to the top of the first dielectric plate 32. As shown in FIG. 5 and FIG. 6, a second opening 420 is disposed in the second dielectric plate 42, the second opening 420 extends from the top to the bottom of the second dielectric plate 42, and the first dielectric plate 32 and the second dielectric plate 42 are joined on the first opening 320 and the second opening 420 so as to be placed perpendicularly to each other. In other words, the first opening 320 is disposed on a lower part of the first dielectric plate 32, and the second opening 420 is disposed on an upper part of the second dielectric plate 42.

Optionally, both the first dielectric plate 32 and the second dielectric plate 42 are rectangles. The first opening 320 extends from the midst of the bottom to the top of the first dielectric plate 32, that is, the first opening 320 is located in the middle of the lower part of the first dielectric plate 32. The second opening 420 extends from the midst of the top to the bottom of the second dielectric plate 42, that is, the second opening 420 is located in the middle of the upper part of the second dielectric plate 42.

During installation, the first dielectric plate 32 is inserted into the second opening 420 of the second dielectric plate 42 through the first opening 320. In addition, because the first opening 320 is located in the middle of the lower part of the first dielectric plate 32, and the second opening 420 is located in the middle of the upper part of the second dielectric plate 42, the first dielectric plate 32 and the second dielectric plate 42 are perpendicularly and orthogonally placed so as to achieve better structural symmetry.

In another possible implementation manner, the first opening 320 may not be limited to being located in the middle of the lower part of the first dielectric plate 32, that is, the first opening 320 is provided on the right or left of the first dielectric plate 32. At the same time, the second opening 420 may not be limited to being located in the middle of the upper part of the second dielectric plate 42 either, that is, the second opening 420 is provided on the right or left of the second dielectric plate 42. When the first opening 320 is not located in the middle of the lower part of the first dielectric plate 32, and the second opening 420 is not located in the middle of the upper part of the second dielectric plate 42, the first dielectric plate 32 and the second dielectric plate 42 are only perpendicularly placed, not perpendicularly and orthogonally placed.

As shown in FIG. 3, as a further improvement of the present invention, to further improve feeding effects of a feeding network, a first groove 342 may be disposed at the first feeding layer 34, the first groove 342 extends from the top to the midst of the first feeding layer 34 and includes a first slot 340 and a second slot 341 connected with the first slot 340, and the first opening 320 penetrates through the second slot 341 and extends to the first slot 340. In an optional implementation manner, the first groove 342 is an inverted T-shaped groove, and the second slot 341 is symmetrically designed relative to an axis of the first slot 340. The axis of the first slot 340 coincides with an axis of the first opening 320.

Similarly, as shown in FIG. 5, as a further improvement of the present invention, a second groove 442 may be disposed at the second feeding layer 44, the second groove 442 extends from the top to the midst of the second feeding layer 44 and includes a third slot 440 and a fourth slot 441 connected with the third slot 440, and the second opening 420 penetrates into the third slot 440. In an optional implementation manner, the second groove 442 is an inverted T-shaped groove, and the fourth slot 441 is symmetrically designed relative to an axis of the third slot 440. The axis of the third slot 440 coincides with an axis of the second opening 420.

In another possible implementation manner, the first groove 342 and the second groove 442 may be in another shape such as a cross-shape, an I-shape, an E-shape, or a C-shape. For the first groove 342 and the second groove 442, reference may be made to the foregoing inverted T-shaped groove design, and the first groove 342 and the second groove 442 is axisymmetric relative to the first opening 320 and the second opening 420, respectively.

As shown in FIG. 2 to FIG. 6, as a further improvement of the present invention, the top and the bottom of the first dielectric plate 32 may be flush with the top and the bottom of the second dielectric plate 42, respectively, so as to install the first dielectric plate 32 and the second dielectric plate 42 on the ground plate 10.

As a further improvement of the present invention, the radiant plate 50 includes a third dielectric plate 52 and a radiating layer 54, the radiating layer 54 is disposed at the bottom of the third dielectric plate 52, and a lower surface of the radiating layer 54 tightly fits an upper surface of the top of the first dielectric plate 32 and an upper surface of the top of the second dielectric plate 42. The radiant plate 50 is disposed on the top of the feeding part 20, and may be placed perpendicularly to the feeding part 20.

In an optional implementation manner, the radiant plate 50 may be a printed circuit board, and the radiating layer 54 is printed at the bottom of the third dielectric plate 52. For example, the third dielectric plate 52 is a square, and the radiating layer 54 is a printed metal-surface-mount structure.

As a further improvement of the present invention, a shape of the radiating layer 54 may be a 4N-regular-polygon, a hollow 4N-regular-polygon, a circle, or an annulus, where N is an integer greater than or equal to 1.

Because the shape of the radiating layer 54 is a 4N-regular-polygon, a hollow 4N-regular-polygon, a circle, or an annulus, standing waves of the first port 360 and the second port 460 are basically consistent and characteristics of directivity patterns for separately feeding at the first port 360 and the second port 460 are basically consistent.

In another implementation manner, the radiant plate 50 may not include the third dielectric plate 52, that is, the radiant plate 50 includes only the radiating layer 54.

In another implementation manner, the radiating layer 54 is printed on the top of the third dielectric plate 52. During installation, the upper surface of the top of the first dielectric plate 32 and the upper surface of the top of the second dielectric plate 42 tightly fit a surface of the bottom of the radiating layer 54.

By using the dual-polarized antenna provided in the foregoing one or more optional implementation manners, the first feeding network and the second feeding network may feed electromagnetic wave signals into the radiating layer 54 in a coupling manner, that is, the feeding part 20 feeds a signal into the radiating layer 54 in a coupling manner. Specifically, energy is coupled to the first feeding layer 34 by using the first transmission line 36, thereby generating a vortex electric field; a horizontal magnetic field is induced in a normal direction, that is, a horizontal direction, of the first feeding layer 34, and energy of the magnetic field is coupled, by using the first groove 342 of the first feeding layer 34, to the radiating layer 54 for radiation.

Likewise, energy is coupled to the second feeding layer 44 by using the second transmission line 46, thereby generating a vortex electric field; a horizontal magnetic field is induced in a normal direction, that is, a horizontal direction, of the second feeding layer 44, and energy of the magnetic field is coupled, by using the second groove 442 of the second feeding layer 44, to the radiating layer 54 for radiation.

As a further improvement of the present invention, the first port 360 is disposed at an end of the first transmission line 36, and extends from the bottom to the top of the first dielectric plate 32.

As shown in FIG. 4, as a further improvement of the present invention, the first transmission line 36 includes a first part of transmission line 362, a second part of transmission line 364, and a third part of transmission line 366. The first part of transmission line 362 extends from an end of the first port 360 to the top of the first dielectric plate 32 and is parallel with the first opening 320; the second part of transmission line 364 spans over the first opening 320 and is perpendicularly connected to the first part of transmission line 362; and the third part of transmission line 366 perpendicularly extends from an end of the second part of transmission line 364 to the bottom of the first dielectric plate 32.

In an optional implementation manner, the second part of transmission line 364 spans over the first opening 320, which means that the first opening 320 does not extend to the second part of transmission line 364 of the first transmission line 36.

In an optional implementation manner, the first port 360 is wider than the first part of transmission line 362, and widths of the first part of transmission line 362, the second part of transmission line 364, and the third part of transmission line 366 are the same. The first part of transmission line 362 is longer than the third part of transmission line 366.

As a further improvement of the present invention, the second port 460 is disposed at an end of the second transmission line 46, and extends from the bottom to the top of the second dielectric plate 42.

As shown in FIG. 6, as a further improvement of the present invention, the second transmission line 46 includes a fourth part of transmission line 462, a fifth part of transmission line 464, and a sixth part of transmission line 466. The fourth part of transmission line 462 extends from an end of the second port 460 to the top of the second dielectric plate 42 and is parallel with the second opening 420; the fifth part of transmission line 464 is perpendicularly connected to the fourth part of transmission line 462; and the sixth part of transmission line 466 perpendicularly extends from an end of the fifth part of transmission line 464 to the bottom of the second dielectric plate 42.

In an optional implementation manner, the second port 460 is wider than the fourth part of transmission line 462, and widths of the fourth part of transmission line 462, the fifth part of transmission line 464, and the sixth part of transmission line 466 are the same. The fourth part of transmission line 462 is longer than the sixth part of transmission line 466.

As a further improvement of the present invention, the midst of the fifth part of transmission line 464 is bent towards the bottom of the second dielectric plate 42 to form a bending part so as to prevent the second opening 420 from penetrating through the fifth part of transmission line 464, that is, the second opening 420 does not penetrate through the second transmission line 46.

As shown in FIG. 2 to FIG. 6, because the first opening 320 does not extend to the second part of transmission line 364 of the first transmission line 36, and the second opening 420 does not penetrate through the second transmission line 46, when the first dielectric plate 32 and the second dielectric plate 42 are perpendicularly and orthogonally placed, the first transmission line 36 and the second transmission line 46 does not touch on an intersection of the first dielectric plate 32 and the second dielectric plate 42, that is, the first transmission line 36 and the second transmission line 46 are separated from each other, so that the first port 360 and the second port 460 are separated from each other.

In another implementation manner, the first transmission line 36 and the second transmission line 46 may be in another shape such as a C-shape or an L-shape. A general rule is that when the first dielectric plate 32 and the second dielectric plate 42 are perpendicularly placed, the first transmission line 36 and the second transmission line 46 does not touch, that is, the first transmission line 36 and the second transmission line 46 are separated from each other.

As a further improvement of the present invention, the dual-polarized antenna 100 further includes a pair of connectors 60 configured to feed signals into the first feeding layer 34 and the second feeding layer 44, one of the connectors 60 is electrically connected to the first port 360, and the other one of the connectors 60 is electrically connected to the second port 460.

In an optional implementation manner, one of the connectors (60) is electrically connected to the first port (360), the other one of the connectors (60) is electrically connected to the second port (460), and electrical connection may be specifically implemented in a wielding manner.

In an optional implementation manner, the connectors 60 are RF connectors that, when a frequency is relatively high, may be also referred to as microwave high-frequency connectors or microwave connectors such as SMAs (Sub-Miniature-As). Characteristic impedances of the connectors are 50 ohm.

In use, the first feeding network and the second feeding network perform coupled feeding to the radiating layer 54 by connecting to the SMA.

Specifically, a microwave signal is fed by using one of the SMAs, and energy is coupled to the first feeding layer 34 by using the first transmission line 36, thereby generating a vortex electric field; a horizontal magnetic field is induced in a normal direction, that is, a horizontal direction, of the first feeding layer 34, and energy of the magnetic field is coupled, by using the first groove 342 of the first feeding layer 34, to the radiating layer 54 for radiation. Likewise, a microwave signal is fed by using the other one of the SMAs, and energy is coupled to the second feeding layer 44 by using the second transmission line 46, thereby generating a vortex electric field; a horizontal magnetic field is induced in a normal direction, that is, a horizontal direction, of the second feeding layer 44, and energy of the magnetic field is coupled, by using the second groove 442 of the second feeding layer 44, to the radiating layer 54 for radiation.

As a possible implementation manner, the ground plate 10 may be a nickel-plated aluminum plate, and the connectors 60 are secured to the aluminum plate. The ground plate 10 provides grounding on the one hand, and serves as a reflective surface on the other hand, so that backward radiation of the dual-polarized antenna 100 is reflected to a main radiation direction, thereby improving a front-to-back ratio and gains of the dual-polarized antenna 100.

After installation, both the lower surface of the bottom of the first dielectric plate 32 and the lower surface of the bottom of the second dielectric plate 42 may tightly fit an upper surface of the ground plate 10.

As a further improvement of the present invention, the dual-polarized antenna 100 further includes multiple fixing posts 70, and the fixing posts 70 are installed on the ground plate 10 and are configured to support the radiant plate 50. In an optional implementation manner, there are four fixing posts 70 that are nylon posts.

During installation, the first dielectric plate 32 and the second dielectric plate 42 are perpendicularly and orthogonally placed and secured to the ground plate 10, and the radiant plate 50 is placed on the top of the fixing posts 70 so that the lower surface of the radiating layer 54 tightly fits the upper surface of the top of the first dielectric plate 32 and the upper surface of the top of the second dielectric plate 42.

In an optional implementation manner, the dual-polarized antenna 100 is 90 mm in width, 90 mm in length, and 30 mm in height.

Figure 7:
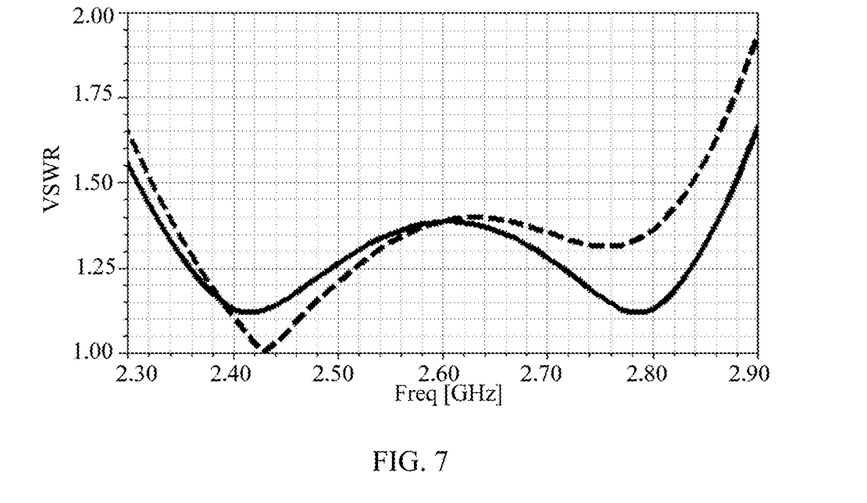
FIG. 7 is a schematic diagram of simulating a voltage standing wave ratio of the dual-polarized antenna shown in FIG. 2.

Referring to FIG. 7, FIG. 7 shows a schematic diagram of simulating a voltage standing wave ratio (VSWR) of the dual-polarized antenna 100 in the present invention, where a solid line is a schematic diagram of simulating a voltage standing wave ratio of the first port 360, and a dashed line is a schematic diagram of simulating a voltage standing wave ratio of the second port 460. It may be learned from the diagram that, the dual-polarized antenna 100 in an implementation manner of the present invention has relatively broad operating bandwidth, and within a frequency range of 2.5 GHz to 2.7 GHz, voltage standing wave ratios of the first port 360 and the second port 460 are less than 1.5.

Figure 8:
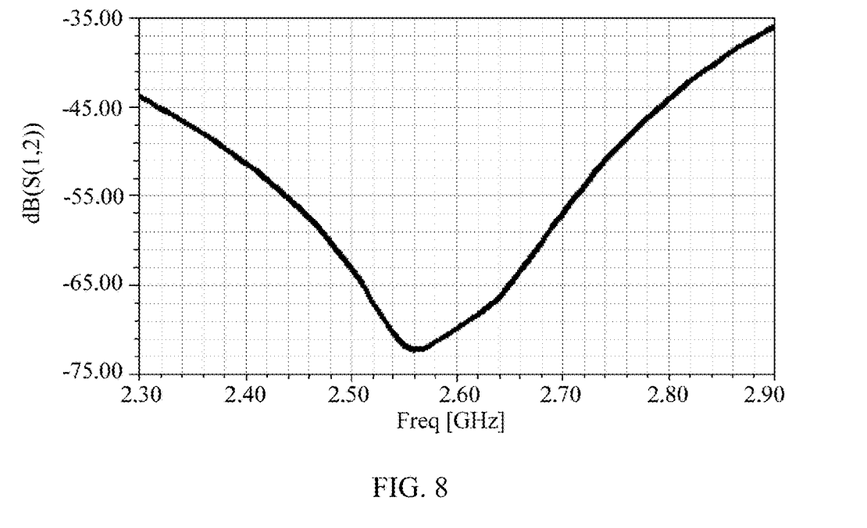
FIG. 8 is a schematic diagram of simulating isolation between a first port and a second port that are of the dual-polarized antenna shown in FIG. 2.

Referring to FIG. 8, FIG. 8 shows a schematic diagram of simulating isolation between the first port 360 and the second port 460 of the dual-polarized antenna 100 of the present invention, which indicates a transmission coefficient from the second port 460 to the first port 360. It may be learned from the diagram that, the dual-polarized antenna 100 in an implementation manner of the present invention has relatively high isolation between ports, and within a frequency range of 2.5 GHz to 2.7 GHz, isolation between the first port 360 and the second port 460 is less than −55 dB.

By using the dual-polarized antenna in the foregoing optional implementation manner, a first feeding network and a second feeding network perform electromagnetic coupled feeding on a radiating layer in a coupled feeding manner. When one of the feeding networks provides feeding, for example, when the first feeding network provides feeding, a current is coupled to a first feeding layer 34 by using a first transmission line 36. An electric field on two sides of a first groove 342 of the first feeding layer 34 is the strongest and antiphase currents are induced on the two sides of the first groove 342. Because the first feeding network and the second feeding network are structurally symmetrical, when energy on the two sides of the first groove 342 is coupled to a second groove 442, two strands of energy are offset due to a same propagation distance, that is, when one of the feeding networks provides feeding, energy coupled to the other feeding network by the one of the feeding networks is greatly weakened, thereby implementing a characteristic of high isolation. In other words, the first feeding network and the second feeding network of the dual-polarized antenna 100 in the implementation manner of the present invention use symmetrical electromagnetic coupled feeding networks, and energy coupling between the two feeding networks is greatly weakened, which further improves isolation between ports compared with another dual-polarized antenna in a feeding manner such as a probe feeding manner or a coplanar microstrip feeding manner.

Figure 9:
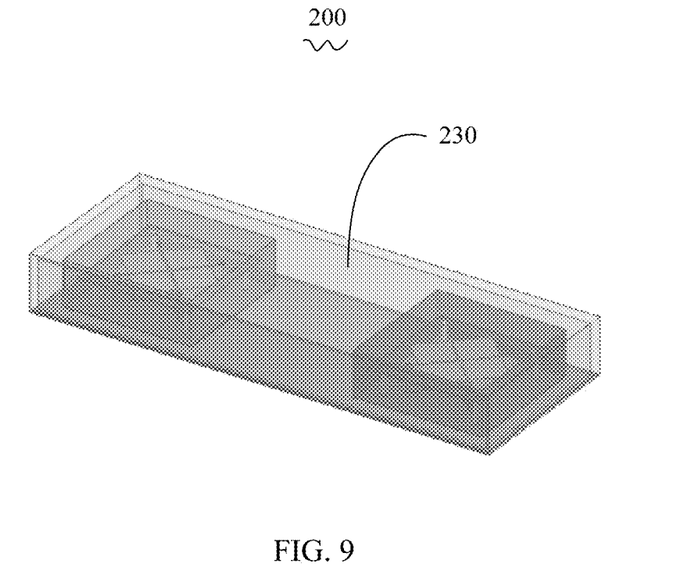
FIG. 9 is a perspective schematic diagram of assembly of an antenna array according to a second implementation manner of the present invention.
Figure 10:
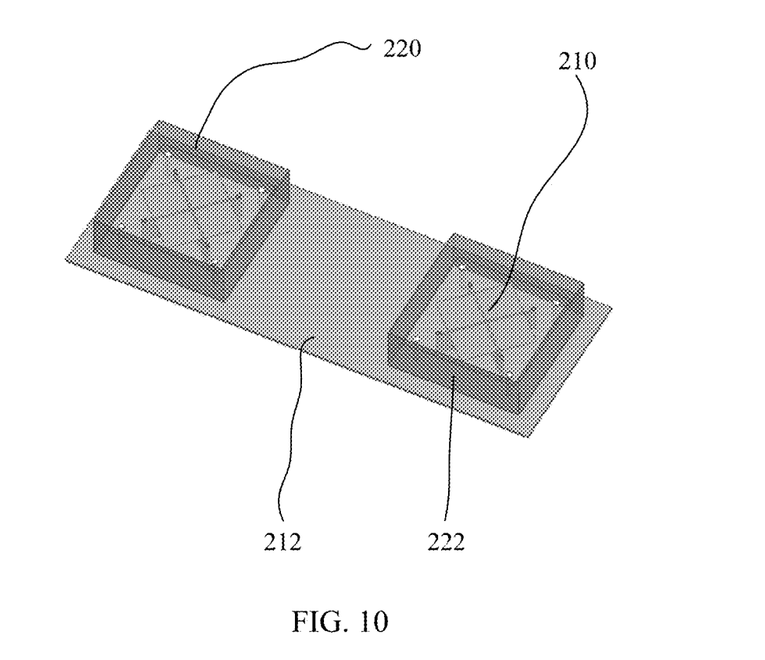
FIG. 10 is a perspective schematic diagram of partial assembly of the antenna array shown in FIG. 9.

Referring to FIG. 9 and FIG. 10 at the same time, FIG. 9 and FIG. 10 show an antenna array 200 according to a second implementation manner of the present invention. The antenna array 200 includes a pair of antennas 210 and a pair of housings 220. A structure of the antenna 210 is the same as a structure of the dual-polarized antenna 100 in the first implementation manner, the housings 220 are secured to the ground plate 212 and include multiple separation walls 222, and the separation walls 222 form a fence configured to fence the antennas 210, so as to improve isolation between co-polarized ports of different antennas 210 and isolation between cross-polarized ports of different antennas 210 in the antenna array 200.

Specifically, after the housings 220 are separately added around the antennas 210, radiation directionality of the antennas 210 may be improved, and radiating energy in a direction between the two antennas 210 is weakened; therefore, energy coupling between the two antennas 210 is also reduced, that is, isolation between co-polarized ports of the antennas 210 and isolation between cross-polarized ports of the antennas 210 are improved.

In an optional implementation manner, the housings have metal frames and are welded to the ground plate 212.

As a further improvement of the present invention, the antenna array 200 further includes a radome 230. The radome 230 covers the antenna array 200, is configured for dust prevention, water proofing, and protection of an inner structure of the antenna array 200, and is configured to beautify the antenna array 200.

In an optional implementation manner, the radome 230 is secured to the ground plate 212.

In an optional implementation manner, antennas in the antenna array 200 are dual-polarized antennas, and each antenna is 90 mm in width, 90 mm in length, and 30 mm in height. A center distance between two antennas is 150 mm.

In another implementation manner, antennas in the antenna array 200 may also be multiple-input multiple-output (MIMO) antennas.

Figure 11:
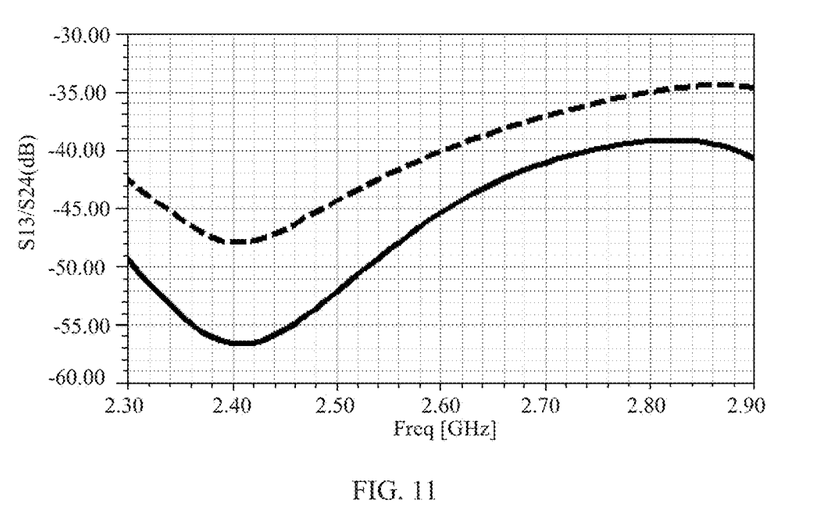
FIG. 11 is a schematic diagram of simulating isolation between co-polarized ports of different antennas in the antenna array shown in FIG. 9.

Referring to FIG. 11, FIG. 11 shows a schematic diagram of simulating isolation between co-polarized ports of different antennas 210 in the antenna array 200 of the present invention, where a dashed line is a schematic diagram of simulating isolation between first ports of different antennas 210, and a solid line is a schematic diagram of simulating isolation between second ports of different antennas 210. Same ports of different antennas 210 may be referred to as co-polarized ports, for example, a first port and a first port of different antennas, or a second port and a second port of different antennas. It may be learned from the diagram that, in a relatively broad frequency range, isolation between a first port and a first port of different antennas 210 or isolation between a second port and a second port of different antennas 210 is less than −35 dB, that is, isolation between co-polarized ports of different antennas 210 is relatively good.

Figure 12:
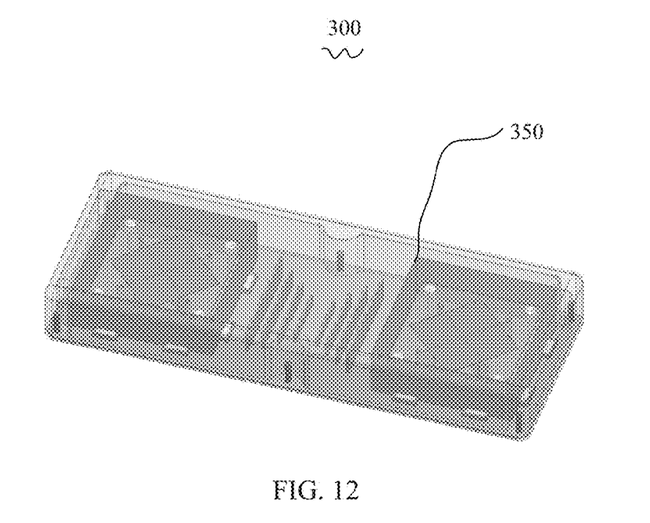
FIG. 12 is a perspective schematic diagram of assembly of an antenna array according to a third implementation manner of the present invention.
Figure 13:
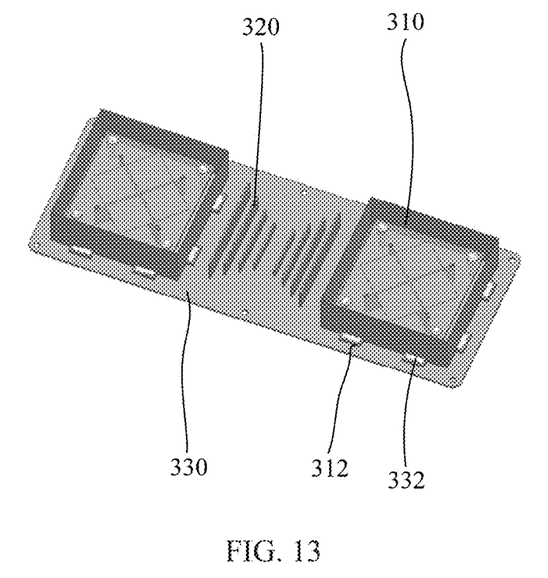
FIG. 13 is a perspective schematic diagram of partial assembly of the antenna array shown in FIG. 12.

Referring to FIG. 12 and FIG. 13 at the same time, FIG. 12 and FIG. 13 show an antenna array 300 according to a third implementation manner of the present invention. The antenna array 300 provided in the third implementation manner may serve as a further improvement of the antenna array 200 provided in the second implementation manner. The antenna array 300 further includes a grounding strip array 320 that is secured to a ground plate 330 and that is located between the two housings 310. The grounding strip array 320 is configured to improve isolation between co-polarized ports of different antennas and isolation between cross-polarized ports of different antennas. The grounding strip array 320 and the ground plate 330 may be molded into one, or the grounding strip array 320 may be secured to the ground plate 330 in a welding manner.

The grounding strip array 320 is disposed between the two housings 310, that is, the grounding strip array 320 is disposed between the two antennas, which can change distribution of electromagnetic waves on an upper surface of the ground plate 330 and distribution of spatial electromagnetic waves between the antennas, and may reduce energy coupling between the antennas, thereby further improving isolation between co-polarized ports of different antennas and isolation between cross-polarized ports of different antennas on a basis of the second implementation manner.

As a further improvement of the present invention, the grounding strip array 320 includes two groups of axisymmetric grounding strips, and an axis of the axial symmetry is located at a perpendicular bisector of the pair of the antennas, or coincides with a central line of the antenna array 300. Each group of the grounding strips includes multiple grounding strips that have different lengths and heights.

In an optional implementation manner, heights and lengths of grounding strips in each group of grounding strips all progressively decrease from an outside to an inside. The outside is close to the dual-polarized antennas (210), and the inside is close to the axis of the axial symmetry.

In an optional implementation manner, the grounding strip array (320) is a metallic strip array, a ferrite strip array, a left-handed material strip array, or an electromagnetic band gap structure. Each grounding strip in the grounding strip array 320 may be a rectangular, or may be in another shape such as a T-shape or an I-shape.

It should be noted that, the antenna array 300 may not include housings 310, and an antenna unit of the antenna array 300 is not limited to the dual-polarized antenna 100 introduced in the foregoing implementation manner, or may be another antenna unit. That is, the antenna array 300 includes at least one pair of antenna units, and a grounding strip array 320 that is installed on a ground plate 330 and that is located between two antenna units, so as to improve isolation between co-polarized ports of different antennas.

As a further improvement of the present invention, each housing 310 includes multiple card slots 312, multiple card blocks 332 are disposed on the ground plate 330, and the card blocks 332 are inserted into the card slots 312, so as to secure the housings 310 to the ground plate 330.

Figure 14:
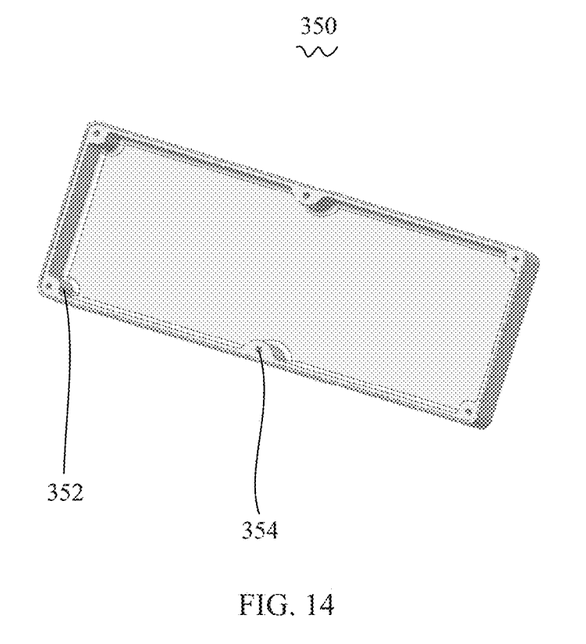
FIG. 14 is a schematic three-dimensional diagram of a radome shown in FIG. 12.

Referring to FIG. 12 to FIG. 14 at the same time, as a further improvement of the present invention, the antenna array 300 further includes a radome 350. The radome 350 covers the antenna array 300, is configured for dust prevention, water proofing, and protection of an inner structure of the antenna array 300, and is configured to beautify the antenna array 300.

As a further improvement of the present invention, multiple fixing posts 352 are disposed on the radome 350, and the fixing posts 352 are disposed on four corners of the radome 350 and in the middle of two opposite side walls. A first fixing hole 354 is disposed in each fixing post 352, and multiple second fixing holes (which are blocked by the radome 350) are disposed on the ground plate 330. During installation, a screw penetrates through a second fixing hole and is secured to the first fixing hole 354, so as to secure the radome 350 to the ground plate 330.

Figure 15:
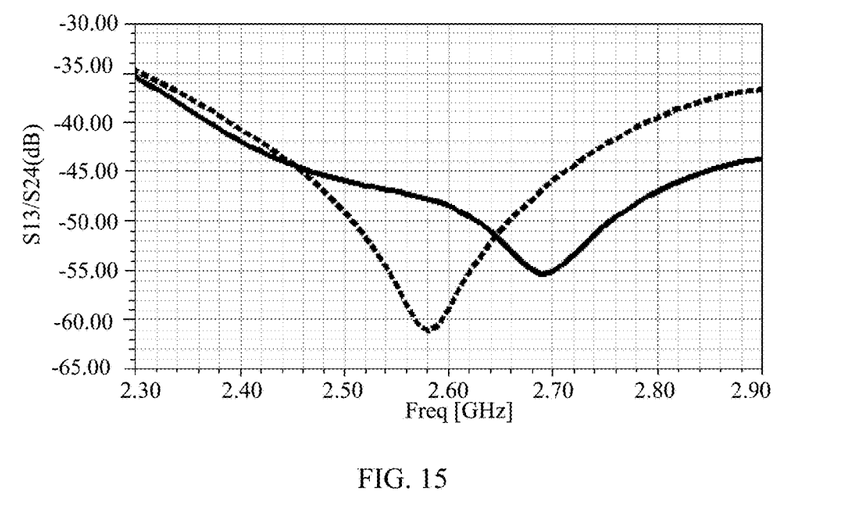
FIG. 15 is a schematic diagram of simulating isolation between co-polarized ports of different antennas in the antenna array shown in FIG. 12.

Referring to FIG. 15, FIG. 15 shows a schematic diagram of simulating isolation between co-polarized ports of different antennas in the antenna array 300 of the present invention, where a dashed line is a schematic diagram of simulating isolation between first ports of different antennas 210, and a solid line is a schematic diagram of simulating isolation between second ports of different antennas 210. It may be learned from the diagram that, after a grounding strip array is added, isolation between co-polarized ports of different antennas changes. Particularly, within a frequency range of 2.5 GHz to 2.7 GHz, the isolation between co-polarized ports of different antennas is further improved, and isolation between a first port and a first port of different antennas or isolation between a second port and a second port of different antennas is less than −45 dB.

The dual-polarized antenna and the antenna array that are provided in all the foregoing implementation manners of the present invention have good isolation between ports, have an appropriate size, may be applicable to a full duplex communications system, and may serve as multiple-input multiple-output (Multiple input and Multiple Output, MIMO) antennas, or may be applicable to any other possible application scenario.

The foregoing implementation manners and schematic structural diagrams or schematic diagrams of simulating are merely intended to exemplarily describe the technical solutions of the present invention, and size proportions and simulation values are not intended to limit the protection scope of the technical solutions. Any modification, equivalent replacement, and improvement made without departing from the spirit and principle of the foregoing implementation manners shall fall within the protection scope of the technical solutions.

What is claimed is:

1. A dual-polarized antenna, comprising:
   a ground plate, a feeding part, and a radiant plate,
   wherein the feeding part is configured to feed an electromagnetic wave signal into the radiant plate and comprises a first feeding part and a second feeding part, the ground plate is disposed at the bottom of the feeding part, and the radiant plate is disposed on the top of the feeding part;
   wherein the first feeding part comprises a first dielectric plate, a first feeding layer, and a first transmission line, wherein the first feeding layer is disposed on one surface of the first dielectric plate, the first transmission line is disposed on the other surface of the first dielectric plate and a first port is disposed in the first transmission line, and the first port is configured to feed a signal into the first feeding part;
   wherein the second feeding part comprises a second dielectric plate, a second feeding layer, and a second transmission line, wherein the second feeding layer is disposed on one surface of the second dielectric plate, the second transmission line is disposed on the other surface of the second dielectric plate and a second port is disposed in the second transmission line, and the second port is configured to feed a signal into the second feeding part;
   wherein the first dielectric plate and the second dielectric plate are perpendicularly installed on the ground plate, the first dielectric plate and the second dielectric plate are placed perpendicularly to each other, and the first transmission line and the second transmission line are separated from each other; and
   wherein the dual polarized antenna further comprises:
   a first opening disposed in the first dielectric plate, the first opening extends from the bottom to the top of the first dielectric plate;
   a second opening disposed in the second dielectric plate, the second opening extends from the top to the bottom of the second dielectric plate, and the first dielectric plate and the second dielectric plate are joined by using the first opening and the second opening so as to be placed perpendicularly to each other;
   a first groove disposed at the first feeding layer, the first groove extends from the top to the midst of the first feeding layer and comprises a first slot and a second slot connected with the first slot, and the first opening penetrates through the second slot and extends to the first slot; and
   a second groove is disposed at the second feeding layer, the second groove extends from the top to the midst of the second feeding layer and comprises a third slot and a fourth slot connected with the third slot, and the second opening penetrates into the third slot.

2. The dual-polarized antenna according to claim 1, wherein:
   the radiant plate comprises a radiating layer, the radiating layer is disposed on a lower surface of the radiant plate, and the feeding part feeds a signal into the radiating layer in a coupling manner.

3. The dual-polarized antenna according to claim 2, wherein:
   a shape of the radiating layer is one of a 4N-regular-polygon, a hollow 4N-regular-polygon, a circle, and an annulus, wherein N is an integer greater than or equal to 1.

4. The dual-polarized antenna according to claim 1, wherein:
   the first port is disposed at an end of the first transmission line, and extends from the bottom to the top of the first dielectric plate; and
   the first transmission line further comprises a first part of transmission line, a second part of transmission line, and a third part of transmission line, the first part of transmission line extends from an end of the first port to the top of the first dielectric plate and is parallel with the first opening, the second part of transmission line spans over the first opening and is perpendicularly connected to the first part of transmission line, and the third part of transmission line perpendicularly extends from an end of the second part of transmission line to the bottom of the first dielectric plate.

5. The dual-polarized antenna according to claim 1, wherein:
   the second port is disposed at an end of the second transmission line, and extends from the bottom to the top of the second dielectric plate; and
   the second transmission line comprises a fourth part of transmission line, a fifth part of transmission line, and a sixth part of transmission line, the fourth part of transmission line extends from an end of the second port to the top of the second dielectric plate and is parallel with the second opening, the fifth part of transmission line is perpendicularly connected to the fourth part of transmission line, and the sixth part of transmission line perpendicularly extends from an end of the fifth part of transmission line to the bottom of the second dielectric plate.

6. The dual-polarized antenna according to claim 5, wherein:
   the midst of the fifth part of transmission line is bent towards the bottom of the second dielectric plate to form a bending part so as to prevent the second opening from penetrating through the fifth part of transmission line.

7. The dual-polarized antenna according to claim 1, further comprising a pair of connectors, one of the pair of connectors is electrically connected to the first port, the other one of the pair of connectors is electrically connected to the second port, and the pair of connectors are configured to feed signals into the first feeding part and the second feeding part.

8. An antenna array, comprising a pair of the dual-polarized antennas according to claim 1 and a pair of housings, wherein each of the pair of housings is secured to the ground plate and comprises multiple separation walls, and the separation walls form a fence configured to fence the pair of dual-polarized antennas.

9. The antenna array according to claim 8, further comprising a grounding strip array that is located between the pair of housings and that is configured to improve isolation between the pair of dual-polarized antennas.

10. The antenna array according to claim 9, wherein:
the grounding strip array comprises two groups of axisymmetric grounding strips, an axis of axial symmetry is located at a perpendicular bisector of the pair of the dual-polarized antennas, heights and lengths of each group of grounding strips progressively decrease from an outside to an inside, the outside is close to the pair of dual-polarized antennas, and the inside is close to the axis of the axial symmetry.

11. The antenna array according to claim 10, wherein:
the grounding strip array is one of a metallic strip array, a ferrite strip array, and a left-handed material strip array.

12. The antenna array according to claim 8, further comprising a radome, and the radome covers the antenna array.

* * * * *